June 29, 1943.    R. E. WARD    2,323,286
MOLD FOR HELICAL SPRINGS
Filed July 23, 1941

Inventor
Ralph E. Ward
By Samuel Scrivener Jr.
Attorney

Patented June 29, 1943

2,323,286

UNITED STATES PATENT OFFICE 2,323,286

MOLD FOR HELICAL SPRINGS

Ralph E. Ward, Erie, Pa.

Application July 23, 1941, Serial No. 403,724

5 Claims. (Cl. 18—34)

This invention relates to the spring-making art, and, more particularly, to the art of forming springs by molding thermoplastic materials and subsequently curing them, in accordance with the process described and claimed in my co-pending application Serial No. 403,768.

In one method of making springs according to the invention disclosed in my co-pending application, a thermoplastic material is molded into the form which the finished spring is desired to have, after which it is immersed in boiling water until a solid, cohesive, resilient device, having the desired spring form, has been produced. It is believed that no earlier method of springmaking has proposed that springs be formed by a molding operation and therefore no molds or molding procedures suitable for use in my described method have been available.

It is therefore the object of this invention to provide a mold which may be employed for the forming of springs of thermoplastic materials in the general manner taught by the invention disclosed in my aforesaid co-pending application.

It is a further object of my invention to provide an apparatus which may be used not only for molding thermoplastic material into spring form but within which the molded material may be held during the final, or immersion, step of my method invention.

A further object of the invention is to provide a mold of novel form and having utility not possessed by molds heretofore known.

Other objects and features of novelty of the invention will be made apparent by the following description and the annexed drawing, it being understood, however, that such description and drawing are only illustrative of the invention and impose no limitation thereon or on the appended claims.

Referring to the drawing, in which like reference numerals refer to like parts,

Figure 1:
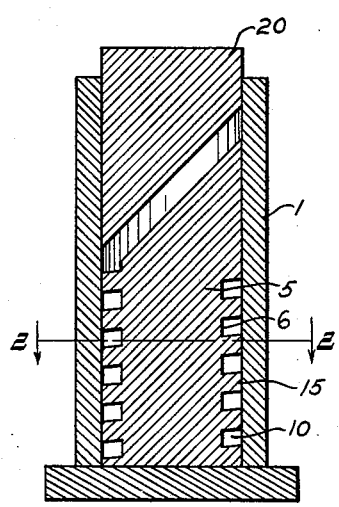
Fig. 1 is a longitudinal sectional view of a mold according to my invention.

The mold provided by this invention, and an embodiment of which is disclosed in Fig. 1 of the drawing forming part of this application, comprises an outer casing or mold-part 1 which may have any desired cross-sectional shape, such as circular or rectangular, and which is formed as a hollow cylinder. The cross-sectional shape and area of the volume bounded by the inner wall of the casing 1 are made similar and equal to the cross-sectional shape and area of a helical coil spring which is to be formed in the mold.

Within the hollow cylindrical, mold-part 1 there is disposed a second mold-part 5 which is preferably formed as a solid cylinder, the axis of which coincides with the axis of the inner wall of the outer casing 1. The outer surface 6 of this inner mold-part has preferably the same shape, in cross-section, as the inner wall of the outer mold-part and these two walls are spaced apart by a distance which is equal to the radial thickness which the wall of the finished spring coil is desired to have. As illustrated in the drawing, the lower end of the inner and outer mold-parts are preferably in the same plane, which is disposed at right angles to their common axis. This disposition of the lower end faces of the mold-parts is employed principally when a squared-end or square-under-load coil spring is to be produced. Otherwise a different disposition of the end faces may be preferable. The upper end of the inner mold-part 5 is preferably inclined to the axis thereof at an acute angle, and such inner part is made much shorter than the outer mold-part. There is therefore left, within the outer mold-part, a space above the inner member, the lower end of such space being bounded by the inclined upper surface of the inner mold-part. This space is employed for a purpose which will appear hereinafter.

Figure 3:
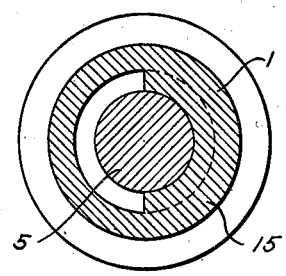
Fig. 3 is a sectional view similar to Fig. 2 and showing the helical form attached to the outer mold cylinder.
Figure 4:
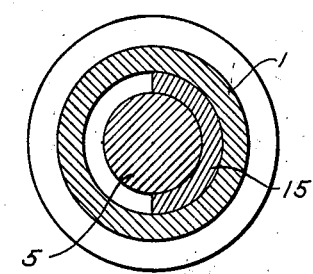
Fig. 4 is a view similar to Fig. 2 and showing the helical form independent of both the outer and inner mold cylinders.

As stated hereinbefore, the inner and outer walls of the members 1 and 5, respectively, are spaced apart by a distance equal to the predetermined thickness of the wall of the finished spring coil. Within this annular space 10 there is disposed a helical form 15 which is preferably formed integrally with, or is attached to, the outer face of the inner mold-part 5 although it may be attached to the outer mold-part only, as illustrated in Fig. 3 or, alternatively, may be separate from both mold-parts as shown in Fig. 4. The dimensions of this helical form are made such that the outer face thereof tightly abuts the inner surface of the outer mold-part 1 throughout the entire length of the helical form. The cross-sectional shape and area of the helical form are made such that the space between adjacent convolutions thereof has a cross-sectional area and shape equal and corresponding to the cross-sectional area and shape which the convolutions of the finished spring are desired to have.

It will be seen that the spaced convolutions of the helical form 15 will define, with the outer wall of the inner mold-part 5 and the inner wall of the outer mold-part 1, a helical space within which the material from which a helical spring coil is to be made is introduced. The tight engagement between the outer face of the helical form 15 and the inner face of the outer mold-part 1 will insure the separation and evenness of the convolutions of the molded spring material.

Disposed within the upper end of the outer mold-part, above the inner part 5, is a plunger 20 which has a cross-sectional shape and area corresponding and equal to those of the space bounded by the inner wall of the outer mold-part 1 and lying above the inner mold-part 5. The upper surface of this plunger may be formed in any desired manner and may be connected to any means or device for forcing it downwardly into the mold-part 1 toward the part 5 and against any material disposed within the space above the inner mold-part. The lower surface of the plunger is preferably inclined at an acute angle to its axis and in parallelism with the upper surface of the inner mold-part.

In the use of the mold disclosed in this application, the same is assembled by placing the parts in the relation shown in Fig. 1 of the drawing, the inner mold part 5 being placed within the outer mold-part 5 in such a manner that the axes of the two parts coincide, the helical form 15 being disposed in the annular space between the two mold-parts. The space above the inner mold-part and below the plunger 20 is now filled with a mixture of the ingredients from which a thermoplastic, such as an acrylic resin, is normally formed. In the example given, these ingredients will be methyl-methacrylate and a solvent such as styrene. This mixture of ingredients is forced by the plunger 20 into the helical space provided between the helical form 15 and the inner and outer walls of the mold-parts 1 and 5, the inclinations of the adjacent faces of the plunger and the inner mold-part facilitating the flow of material into the helical mold-space.

Figure 5:
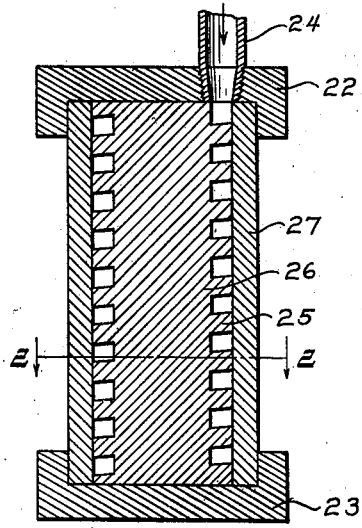
Fig. 5 is a longitudinal sectional view of an embodiment of the invention which is particularly adapted for injection molding.
Figure 2:
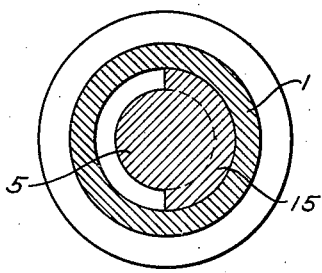
Fig. 2 is a sectional view taken on the line 2—2 of either Fig. 1 or Fig. 5, showing the helical form attached to the inner mold cylinder.

If desired, the plunger 20 may be eliminated from the mold apparatus and a mold provided having both ends thereof closed, such a mold being illustrated in Fig. 5 of the drawing wherein the closures 22, 23 are provided. In this embodiment of the invention the mixed ingredients are injected into the mold under pressure in a manner similar to that now in use in known injection molding operations. For example, the moldable material may be introduced into the molding space through a tube or pipe 24 which preferably communicates with the helical mold-space through the closure 22. The closure of one or both ends of the mold of Fig. 5 is removable in order that the inner mold member 26 and the molded thermoplastic helix may be removed from the mold. As in the embodiment hereinbefore described, the helical form 25 may be attached to the inner mold member 26 or to the outer mold member 27 or may be independent of both, all as illustrated in Figs. 2, 3 and 4 of the drawing.

After the helical mold space of either embodiment of the invention has been completely and tightly filled with the thermoplastic material the parts are retained in the described relation and are used as a support for the molded helix while it is subjected to the final step of my invented method of forming springs. In this step the entire mold apparatus, with the molded helix therein, is immersed in boiling water, as described in my aforesaid co-pending application, until the molded helix is solid, coherent and resilient. When the immersion step is completed the inner mold-part may be removed from the outer part and the helical element formed of a thermoplastic material removed therefrom by unscrewing. This helical element will be resilient and will have all of the usual properties of a helical coil spring.

Figure 6:
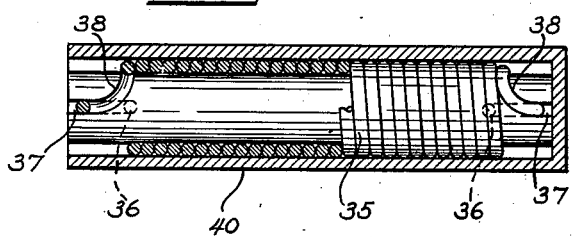
Fig. 6 is a longitudinal view, partly sectional and partly in elevation, of a mold apparatus for forming extension springs.

In Fig. 6 of the drawing there is illustrated a mold apparatus intended particularly for the formation of extension springs from molded or extruded rods or bars of thermoplastic material in accordance with a process described and claimed in my aforesaid co-pending application. In this embodiment, an inner cylindrical form 35 is provided having at each end a form for the end loop which is necessary in extension springs. At each end such loop form comprises a recess 36 formed in the peripheral wall of the form and spaced from the end thereof, from which a groove in the peripheral wall passes to the end of the form and is curved over the end, as at 37, and then away from the end and also circumferentially, as at 38, being then of decreasing depth until it merges with the outer peripheral wall of the form. A rod or bar 37 of thermoplastic material which has been softened, as by being passed through water heated to 135 to 150° F., is wound about the form 35 to form a helix. One end of the rod or bar is inserted axially into one of the recesses 36, the adjacent material of the rod or bar being then brought over the end of the form through the grooves 37 to provide one end loop, the rod being then coiled about the entire length of the form and the other end of the rod being passed over the end of the form in the groove 37 and anchored in the recess 36, thus providing the second end loop. The form, with the coiled thermoplastic rod thereon, is then inserted into the outer mold-part 40, the inner diameter of which is of such a size as to tightly fit the outer periphery of the coiled rod, after which the assembly is subjected to the hot immersion step of my invention. The form 35 may then be removed from the outer mold-part and the helix, which is now resilient and spring-like, removed therefrom.

It will be seen that a battery of molds of any of the forms described may be provided, together with machine or other means for introducing and forcing the ingredients into the helical mold-space. It will also be recognized by those skilled in the art that modifications of the described structure may be made and further embodiments discovered, all without departing in any way from the spirit or scope of the invention, for the limits of which reference must be had to the appended claims.

What is claimed is:

1. A mold for a helical spring comprising a hollow mold-part, a second cylindrical mold-part disposed concentrically within the outer mold-part and being of such cross-sectional size that an annular space is provided between the two mold-parts, a helical form disposed in said annular space and being of such radial dimensions as to extend from the outer wall of the inner mold-part to the inner wall of the outer mold-part whereby a molding space is provided between the upper and lower faces of the convolutions of the helical form, the inner face of the outer mold-part and the outer face of the inner mold-part, the inner mold-part being longitudinally shorter than the outer mold-part whereby a space is provided within the outer mold-part and above the inner mold-part which communicates with the helical molding space and within which moldable material is adapted to be received.

2. A mold according to claim 1, in which the helical form is attached to the inner mold-part.

3. A mold according to claim 1, in which the helical form is attached to the outer mold-part.

4. A mold according to claim 1, in which the helical form is separate from the inner and outer mold-parts.

5. A mold for a helical spring comprising a hollow cylindrical mold-part, a second cylindrical mold-part disposed concentrically within the outer mold-part and being of such cross-sectional size that an annular space is provided between the two mold-parts, a helical form disposed in said annular space and being of such radial dimensions as to extend from the outer wall of the inner mold-part to the inner wall of the outer mold-part whereby a molding space is provided between spaced adjacent faces of the convolutions of the helical form, the inner face of the outer mold-part and the outer face of the inner mold-part, the inner mold-part having an inclined end which is disposed entirely within the outer mold-part thereby providing a space within the outer mold-part for the reception of moldable material, and a plunger disposed in such space and having an inclined end adjacent and parallel to the inclined end of the inner mold member.

RALPH E. WARD.